United States Patent
Kim et al.

(10) Patent No.: US 7,009,674 B2
(45) Date of Patent: Mar. 7, 2006

(54) VERTICAL ALIGNMENT MODE LIQUID CRYSTAL DISPLAY

(75) Inventors: Sung Woon Kim, Kyoungki-do (KR); Dong Hae Suh, Daegu (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 107 days.

(21) Appl. No.: 10/323,456

(22) Filed: Dec. 18, 2002

(65) Prior Publication Data

US 2003/0156242 A1 Aug. 21, 2003

(30) Foreign Application Priority Data

Feb. 20, 2002 (KR) ............... 10-2002-0008923

(51) Int. Cl.
*G02F 1/1343* (2006.01)
*G02F 1/1333* (2006.01)
*G02F 1/1337* (2006.01)

(52) U.S. Cl. ............ 349/143; 349/130; 349/110
(58) Field of Classification Search ........ 349/106, 349/110, 129, 143, 142, 141, 130
See application file for complete search history.

(56) References Cited

U.S. PATENT DOCUMENTS

| | | | | |
|---|---|---|---|---|
| 5,434,690 A | * | 7/1995 | Hisatake et al. | 349/8 |
| 5,587,818 A | * | 12/1996 | Lee | 349/106 |
| 6,204,905 B1 | * | 3/2001 | Koma et al. | 349/138 |
| 6,226,067 B1 | | 5/2001 | Nishiguchi et al. | |
| 6,392,736 B1 | | 5/2002 | Furukawa et al. | |
| 6,403,980 B1 | | 6/2002 | Park | |
| 6,417,908 B1 | | 7/2002 | Nishiguchi et al. | |
| 6,549,257 B1 | * | 4/2003 | Liu | 349/129 |
| 6,600,539 B1 | * | 7/2003 | Song | 349/130 |
| 6,639,640 B1 | * | 10/2003 | Matsuoka et al. | 349/139 |
| 6,657,695 B1 | * | 12/2003 | Song et al. | 349/143 |

* cited by examiner

*Primary Examiner*—Andrew Schechter
*Assistant Examiner*—Hoan C. Nguyen
(74) *Attorney, Agent, or Firm*—Ladas & Parry LLP

(57) ABSTRACT

Disclosed is a vertical alignment mode liquid crystal display. The liquid crystal display comprises a pixel electrode formed on a lower substrate, a counter electrode formed on an upper substrate, and a vertical alignment layer forcing liquid crystal molecules in a liquid crystal layer to be aligned in a vertical direction, wherein the counter electrode is parallelly faced to the pixel electrode while being displaced from the pixel electrode at an interval along a surface of the lower substrate or the upper substrate. Therefore, the liquid crystal display has various properties of a high contrast, a high transmittance resulting from constraint of a disclination, and a fast response speed resulting from identical alignment of the liquid crystal molecules.

3 Claims, 3 Drawing Sheets

VERTICAL ALIGNMENT MODE LIQUID CRYSTAL DISPLAY

BACKGROUND OF THE INVENTION

1. Field of the Invention

The present invention relates to a vertical alignment mode liquid crystal display, and more particularly to vertical alignment mode liquid crystal display for preventing a disclination from being generated.

2. Description of the Prior Art

A twisted nematic mode liquid crystal display (LCD) has been widely used as one of the conventional flat panel display techniques, but it has the disadvantage of providing a narrow viewing angle. For this reason, a vertical alignment mode LCD has been proposed.

A vertical alignment mode LCD in the art is so designed that, as shown in FIG. 1, liquid crystal molecules 6 are aligned in a direction normal to a pixel electrode 3 on a lower substrate 1 as well as a counter electrode 9 on an upper substrate 11 through an influence of a vertical alignment layer. Specifically, the longitudinal axes of liquid crystal molecules 6, contained in the liquid crystal layer between two substrates, are arranged in a direction normal or perpendicular to each of the substrates. Therefore, the vertical alignment mode LCD has an advantage in that it can obtain a high contrast in the direction normal to each of the substrates.

However, the conventional vertical alignment mode LCD has problems as following.

As shown in FIG. 1, when the liquid crystal molecules 6 are arranged in a direction parallel to the substrates 1 and 11 under an electric field, a disclination region A is generated in which a transmittance drops down significantly due to the absence of a preferred arrangement oriented in a certain direction. Due to the disclination region A, the conventional vertical alignment mode LCD has a decreased transmittance and the liquid crystal molecules have a slow response speed.

To solve this problem, a multidomain vertical alignment mode LCD has been proposed so as to provide a preferred arrangement in a certain direction as well as a wide viewing angle. Nevertheless, such a disclination is still generated.

SUMMARY OF THE INVENTION

Accordingly, the present invention has been made to solve the above-mentioned problems occurring in the prior art, and an object of the present invention is to provide a vertical alignment mode liquid crystal display capable of preventing a disclination from being generated by establishing an electric field in a certain direction through a positional change in a pixel electrode and a counter electrode.

In order to accomplish these objects, there is provided a vertical alignment mode liquid crystal display, comprising: a pixel electrode formed on a lower substrate; a counter electrode formed on an upper substrate; and a vertical alignment layer forcing liquid crystal molecules in a liquid crystal layer to be aligned in a vertical direction, wherein the counter electrode is parallelly faced to the pixel electrode while being displaced from the pixel electrode at an interval along a surface of the lower substrate or the upper substrate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
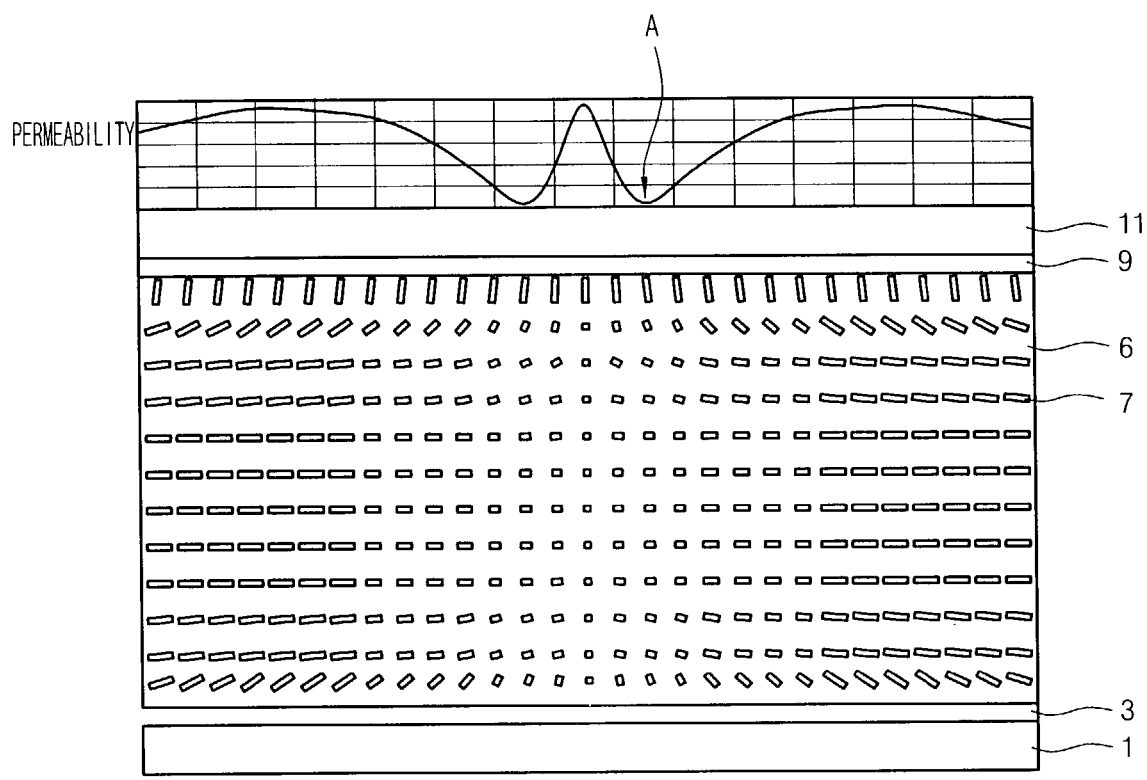
FIG. 1 is a cross-sectional view illustrating a vertical alignment mode liquid crystal display according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
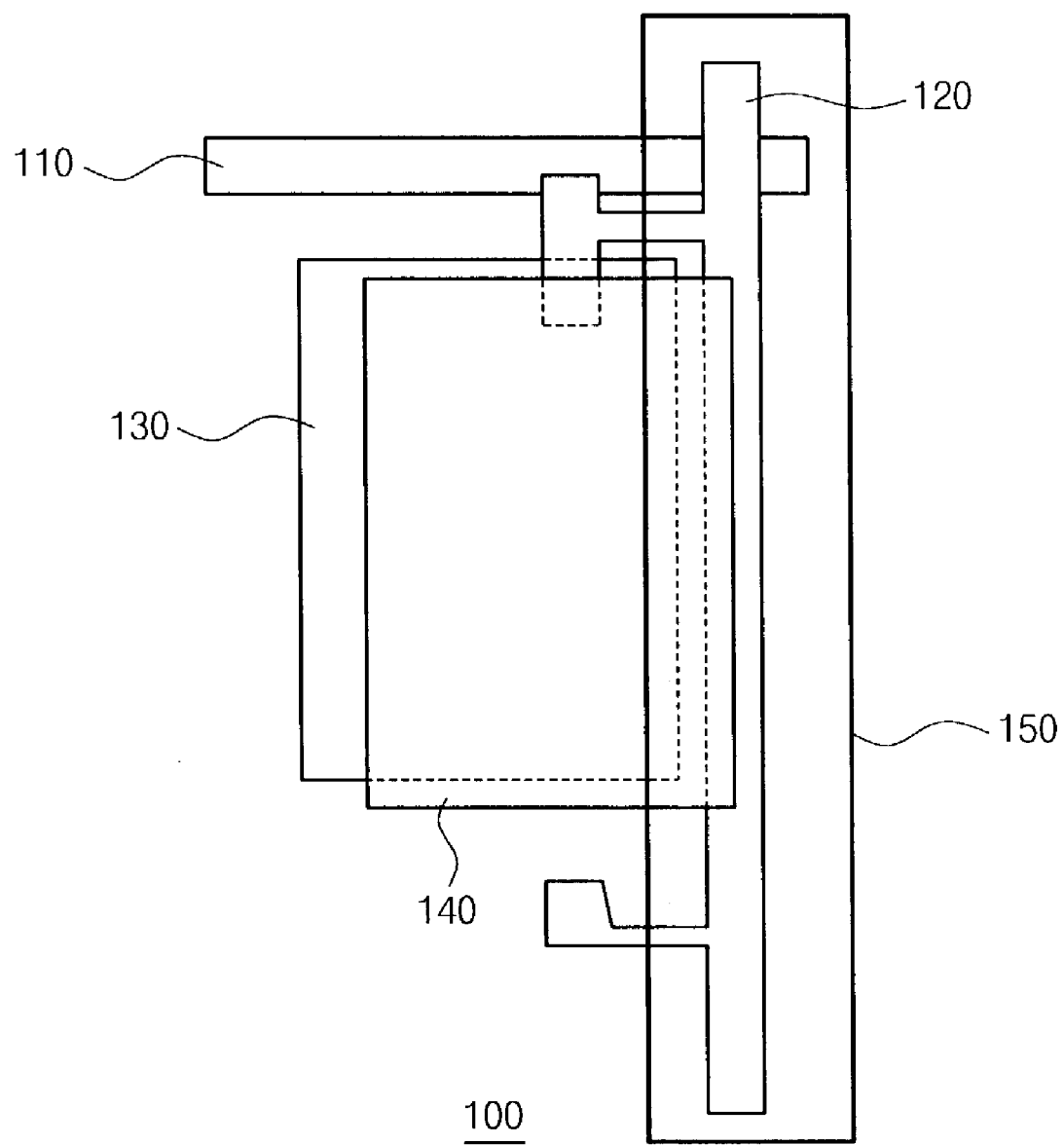
FIG. 2 is a plane view illustrating a vertical alignment mode liquid crystal display according to the present invention.

As shown in FIG. 2, a vertical alignment mode liquid crystal display (LCD) includes a pixel electrode 130 formed on a lower substrate 100 in which a gate line 110 is arranged perpendicular to a data line 120, and a counter electrode 140 formed on an upper substrate (not shown) in which a color filter (not shown) is provided. Here, the pixel electrode 130 is parallelly faced to the counter electrode 140. Specifically, the pixel electrode 130 and the counter electrode 140 are disposed in parallel with each other in such a way in which they deviate from each other's position rather than being exactly matched with each other. Therefore, the counter electrode 140 is displaced from, while maintaining in parallel with, the pixel electrode 130 along a surface of the lower substrate 110 or the upper substrate (not shown), for example, in a right direction.

To cover the deviated portion where the pixel electrode 130 deviates from the position of the counter electrode 140 and the data line 120, a block matrix 150 is formed on the upper substrate (not shown). Even if not shown in the drawings, a vertical alignment layer, which causes liquid crystal molecules to be arranged in a vertical direction, is formed on at least one of the lower substrate 100 and upper substrate.

The vertical alignment mode liquid crystal display (LCD) according to the present invention is operated as following.

Figure 3:
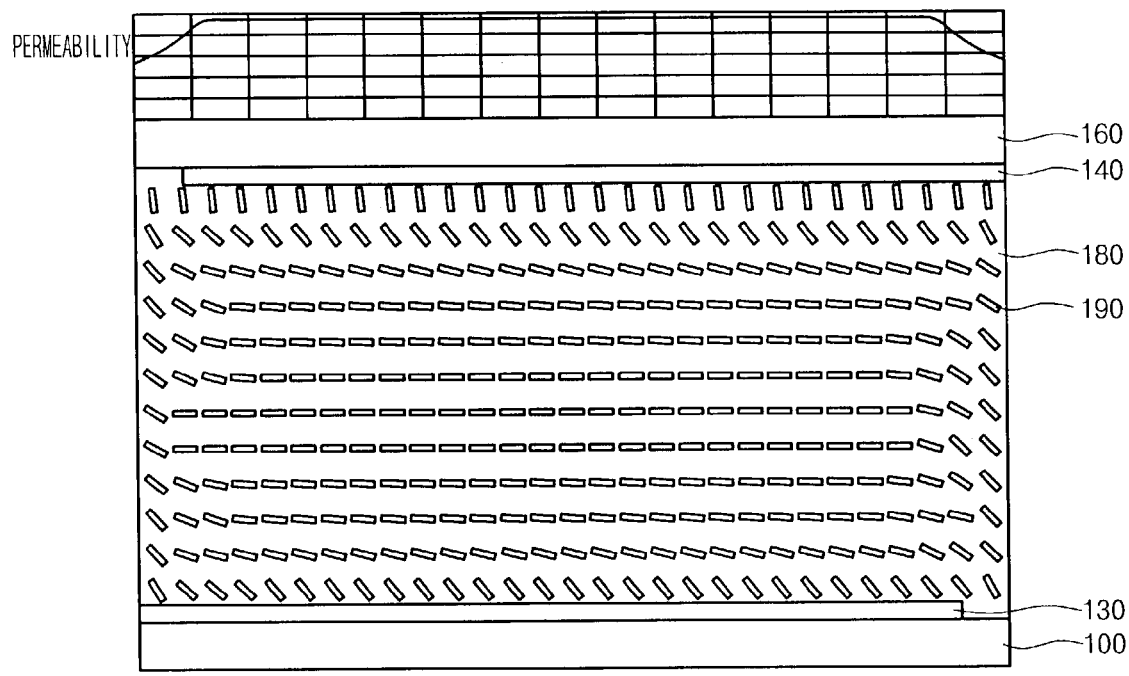
FIGS. 3 and 4 are cross-sectional views illustrating a vertical alignment mode liquid crystal display according to the present invention.

As shown in FIG. 3, when power is applied, an electric field is established in a given direction between the pixel electrode 130 on the lower substrate 100 and the counter electrode 140 on the upper substrate 160, and thus liquid crystal molecules 190 in the liquid crystal layer 180 are aligned in the same direction as that of the electric field. That is to say, all the liquid crystal molecules are aligned in one direction within a certain pixel without interference from other liquid crystal molecules having a disposition to be aligned in other directions. Therefore, a response speed of the liquid crystal molecules is increased.

Figure 4:
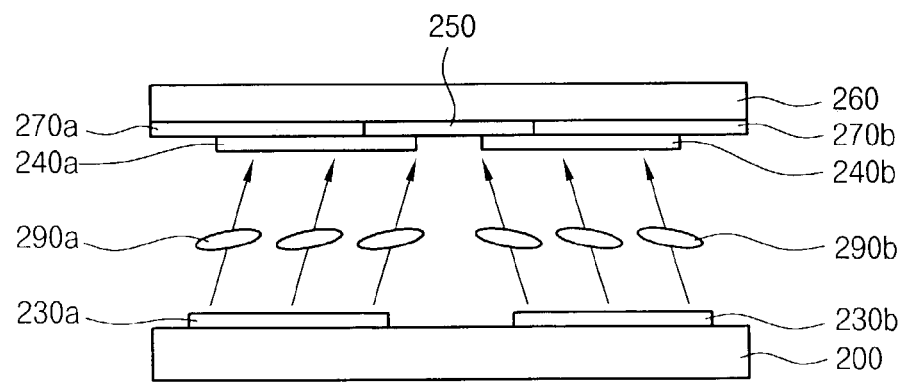

Further, as shown in FIG. 4, in any one of pixel regions, a first pixel electrode 230a on a lower substrate 200 is parallelly displaced from a first counter electrode 240a on an upper substrate 260 in one direction, for example, in a right direction. Also, in an adjacent pixel region, a second pixel electrode 230b on a lower substrate 200 is parallelly displaced from a second counter electrode 240b on an upper substrate 260 in a left direction, opposite to the right direction. Therefore, the liquid crystal molecules 290*a* and 290*b* in each pixel region are symmetrically aligned to each other as in a multidomain, thereby providing a wide viewing angle.

Meanwhile, when a black matrix 250 is disposed between color filters 270*a* and 270*b* at the border where each pixel region is distinguished, a disclination, which results from a alignment difference of the liquid crystal molecules 290*a* and 290*b* in each pixel region, is generated in the black matrix 250, so that it has no influence on transmittance.

As seen from the above, the vertical alignment mode LCD according to the present invention can accomplish various effects, such as improving a contrast property, a transmittance property resulting from constraint of disclination, and a response speed property resulting from identical alignment of the liquid crystal molecules.

Although preferred embodiments of the present invention have been described for illustrative purposes, those skilled in the art will appreciate that various modifications, additions and substitutions are possible, without departing from the principle and spirit of the invention as defined by the appended claims. Therefore, the present invention is not limited to those embodiments as set forth therein, and includes all inventive novel features thereof.

What is claimed is:

1. A vertical alignment mode liquid crystal display having a liquid crystal layer, comprising:

two pixel regions formed side by side, each pixel region comprising:

a pixel electrode having a planar pixel electrode member formed parallel to one side of the liquid crystal layer;

a counter electrode having a planar counter electrode member formed parallel to the other side of the liquid crystal layer, wherein the planar pixel and counter electrode members in each pixel region are of substantially the same size and substantially covering the entire area of the pixel region and substantially overlapping with each other with exception of the edges, and wherein each counter electrode member in each pixel region is displaced toward the boundary between the two pixel regions more than the pixel electrode in each pixel region is displaced toward the boundary between the two pixel regions; and a vertical alignment layer forcing liquid crystal molecules in the liquid crystal layer to be aligned in a vertical direction.

2. A vertical alignment mode liquid crystal display as claimed in claim 1, wherein a black matrix is formed on an upper substrate, on which the counter electrode is formed, over at least a portion of the non-overlapping region of the planar counter and pixel electrode members.

3. A vertical alignment mode liquid crystal display as claimed in claim 1, wherein the vertical alignment layer is formed on at least one of a lower substrate, on which the pixel electrode is formed, and the upper substrate.

* * * * *